(12) United States Patent
Sridharan et al.

(10) Patent No.: US 7,908,521 B2
(45) Date of Patent: Mar. 15, 2011

(54) PROCESS REFLECTION

(75) Inventors: Baskar Sridharan, Sammamish, WA (US); Abdelsalam A. Heddaya, Bellevue, WA (US); Jonathan D. Morrison, North Bend, WA (US); Mujtaba S. Khambatti, Sammamish, WA (US); Anthony J. Lorelli, Kirkland, WA (US); Tristan P. K. Schmelcher, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 379 days.

(21) Appl. No.: 12/146,438

(22) Filed: Jun. 25, 2008

(65) Prior Publication Data

US 2009/0327815 A1 Dec. 31, 2009

(51) Int. Cl.
*G06F 11/00* (2006.01)
(52) U.S. Cl. .......................................... 714/38; 717/127
(58) Field of Classification Search .................... 714/35, 714/38; 717/127
See application file for complete search history.

(56) References Cited

U.S. PATENT DOCUMENTS

| | | | |
|---|---|---|---|
| 6,094,530 A * | 7/2000 | Brandewie ..................... 717/127 |
| 6,161,193 A | 12/2000 | Garg et al. |
| 6,195,765 B1 * | 2/2001 | Kislanko et al. ............... 714/38 |
| 6,219,828 B1 * | 4/2001 | Lee ............................... 717/129 |
| 6,560,629 B1 | 5/2003 | Harris |
| 6,988,264 B2 | 1/2006 | Sarma et al. |
| 7,020,800 B2 * | 3/2006 | Fu et al. ........................ 714/38 |
| 7,284,156 B2 * | 10/2007 | Creamer et al. ............... 714/38 |
| 7,313,599 B2 * | 12/2007 | Maeda et al. .................. 709/213 |
| 7,555,744 B2 * | 6/2009 | Chkodrov et al. ............. 717/124 |
| 7,613,597 B2 * | 11/2009 | Vertes ............................ 703/2 |
| 2004/0215998 A1 | 10/2004 | Buxton et al. |
| 2004/0221269 A1 * | 11/2004 | Ray et al. ...................... 717/124 |
| 2005/0097399 A1 * | 5/2005 | Bliss et al. .................... 714/38 |
| 2006/0101189 A1 | 5/2006 | Chandrasekaran et al. |
| 2009/0150885 A1 * | 6/2009 | Safari et al. ................... 718/1 |

OTHER PUBLICATIONS

Douglis et al., "Transparent Process Migration: Design Alternatives and the Sprite Implementation", vol. 21(8), John Wiley & Sons, Ltd., 1991, pp. 757-785.
McKeith, "DSClone—A New Tool for Disaster Recovery", Mar. 18, 2005, Retrieved at <<http://www.novell.com/coolsolutions/feature/11574.html>>, pp. 1-4.
Vrenios, "Process Cloning in C", retrieved at <<http://linuxgazette.net/issue51/vrenios.html>>, Alex Vrenios, 2000, pp. 1-3.

* cited by examiner

*Primary Examiner* — Marc Duncan

(57) ABSTRACT

Process reflection techniques are described in which a reflected process is created to facilitate analysis of a process. Events are detected to initiate reflection of a target process. Process reflection of a target process may be initiated by an external process or by the target process itself. A reflected process of the target process is created. In an implementation, data defining the target process is replicated, copied, or otherwise collected from the target process to create the reflected process. Then, analysis may be performed on the reflected process while execution of the target process continues.

18 Claims, 4 Drawing Sheets

PROCESS REFLECTION

BACKGROUND

On occasion, processes (e.g., applications executing on a computing device) may experience problems such as bugs, memory leaks, crashes, hang-ups, and so forth. One technique to discover and resolve such problems is through live diagnosis, analysis, and/or debugging of processes on a user's computing device in the field. However, traditional techniques for live diagnosis of a process may be quite disruptive to the user as these techniques involve suspending the process for the duration of the diagnosis. Such diagnosis can last anywhere from tens of seconds, for leak detection and dump creation, to several hours or even days for debugging of processes with very large memory allocations. In addition, live diagnosis of a process following a crash or a hang may prevent restarting of the process until the diagnosis is complete.

SUMMARY

Process reflection techniques are described in which a reflected process is created to facilitate analysis of a process. Events are detected to initiate reflection of a target process. Process reflection of a target process may be initiated by an external process or by the target process itself. A reflected process of the target process is created. In an implementation, data defining the target process is replicated, copied, or otherwise collected from the target process to create the reflected process. Then, analysis may be performed on the reflected process while execution of the target process continues.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

One technique to discover and resolve problems that may occur with processes (e.g., applications executing on a computing device) is through live diagnosis, analysis, security, recovery, and/or debugging of processes on a user's computing device in the field. However, traditional techniques for live diagnosis of a process may be quite disruptive to the user as these techniques involve suspending the process for the duration of the diagnosis.

Process reflection techniques are described in which a reflected process is created to facilitate diagnosis and analysis of a target process, which may be performed with little or no user disruption. A variety of different diagnosis/analysis techniques may be performed on the reflected process while execution of the target process continues.

For example, when Bob uses his word processor he may notice that certain keystrokes cause the word processor to "crash". Using process reflection techniques, when the word processor crashes, a reflection module may detect the crash and initiate a reflection of the word processor. The reflection module may collect a variety of data that defines a state of the executing word processor. Using this collected data, the reflection module may call functionality of an operating system to cause creation of a reflection of the word processor, e.g., a reflected process. The reflected process closely recreates the state of the word processor. The reflected process may be created very quickly and then Bob's word processor may be restarted. Thus, Bob is able to continue working with little disruption.

Behind the scenes, analysis may occur on the reflected process to debug the crash. For instance, a debugging tool may operate on the reflected process and communicate information back to a manufacturer or developer. When the cause of the word processor crash is determined, a fix may be sent to Bob's computing device and installed automatically. Thereafter, Bob may notice that the keystrokes no longer cause his word processor to crash. Bob may not even have been aware of the process reflection and analysis occurring behind the scenes to correct his problem with the word processor.

In the following discussion, an example environment is first described that is operable to perform process reflection techniques. Example procedures are then described that may be employed in the example environment, as well as in other environments. Although these techniques are described as employed within an example computing environment in the following discussion, it should be readily apparent that these techniques may be incorporated within a variety of environments without departing from the spirit and scope thereof.

Example Environment

Figure 1:
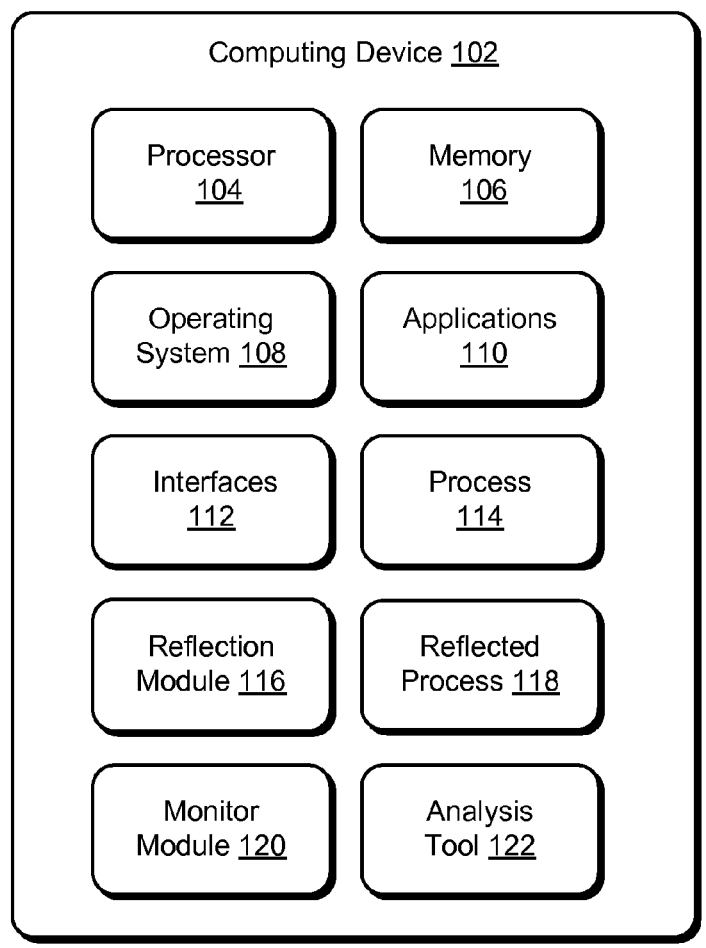
FIG. 1 depicts an example environment in which process reflection techniques may be employed.

FIG. 1 is an illustration of an environment 100 in an example implementation that is operable to employ process reflection techniques described herein. The illustrated environment 100 includes a computing device 102 having one or more processors 104 and a memory 106. Computing device 102 may be configured in a variety of ways. For example, computing device 102 may be configured as a computer that is capable of communicating over a network, such as a desktop computer, a mobile station, a laptop, an entertainment appliance, a set-top box communicatively coupled to a display device, a wireless phone, a game console, and so forth. In the following description a referenced component, such as computing device 102, may refer to one or more entities. Therefore, by convention, reference may be made to a single entity (e.g., the computing device 102) or multiple entities (e.g., the computing devices 102, the plurality of computing devices 102, and so on) using the same reference number.

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. The one or more processors 104 may perform single threaded and multi-threaded operations. Additionally, although a single memory 106 is shown for the computing device 102, a wide variety of types and combinations of computer readable memories may be employed including volatile and non-volatile memory and/or storage media. For example, computer readable memories/media may include but are not limited to random access memory (RAM), hard disk memory, read only memory (ROM), flash memory, video memory, removable medium memory, and other types of computer-readable memories/media that are typically associated with a computing device 102 to store data, executable instructions, and the like.

The computing device 102 is further illustrated as including an operating system 108 and a variety of applications 110. The one or more processors 104 may retrieve and execute computer-program instructions from applications 110 to provide a wide range of functionality to the computing device 102, including but not limited to office productivity, email, media management, printing, networking, web-browsing, and so forth. A variety of program data related to the applications 110 is contemplated, examples of which include office documents, multimedia files, emails, data files, web pages, user profile and/or preference data, and so forth.

Computing device 102 may also include various interfaces 112 through which applications 110 may interact with the operating system 108, common resources, dynamic link libraries (DLLs), networks resources (content and services), and so forth. Interfaces 112 may include a network interface through which application 110 may engage in various network interactions over a network (not shown) accessible to the computing device 102. Interfaces 112 may also include one or more application programming interfaces (APIs) providing core tools and functions that may be used to take advantage of the functionality of the operating system 108. Generally, APIs are interfaces 112 that various applications 110 may call to take advantage of various tools, resources, features, services and so forth provided via the operating system 108. A variety of other examples are also contemplated.

An application 110, when executed, may utilize one or more interfaces 112 to interact with the operating system 108 and/or resources of the computing device 102, such as processor 104, memory 106, common resources, DLLs, network interface, peripheral devices, and so forth. An executed instance of an application 110 may be referred to as a process 114. Process 114 depicted in FIG. 1 is representative of many such processes 114 (e.g., executing instances of applications 110 or other code) that may exist on a computing device 102. Operating system 108 may support and manage creation, execution, and destruction of processes 114.

For instance, operating system 108 may allocate memory 106 for a process, load program instructions to the allocated space in memory 106, and assign a process identifier (PID). Operating system 108 also manages multiple processes 114, such as scheduling sequential processing of program instructions for the multiple processes on one or more processors 104. By way of example and not limitation, a process 114 may consist of a process identifier (PID), memory allocation and addressing, an instance of executable program instructions for the corresponding application 110, process registers, a process counter, and so forth. Multiple processes 114 may be derived from the same application 110.

Sometimes, applications 110 and processes 114 experience problems. For instance, a process 114 may "hang up", memory leaks may occur, heap errors may occur, and so forth. Traditional techniques to detect, analyze, and debug such errors may involve suspension of the process 114. This may be quite disruptive to a user who is unable to interact with the suspended process 114 during the duration of the analysis, which may last several minutes, hours, or even days for some processes 114.

Process reflection techniques are described herein. For instance, the computing device 102 is further illustrated as including a reflection module 116 that is representative of functionality operable to create a reflected process 118 corresponding to a process 114. Reflection module 116 may be storable in memory 106 and executable via the processor 104. In an implementation, reflection module 116 may interact with one or more interfaces 112 to cause creation of a reflected process 118 through the operating system 108.

The reflection module 116 to may be implemented in a variety of ways to provide process reflection techniques to enable diagnosis for applications 110 and computing devices 102. For instance, reflection module 116 may be configured as a stand-alone component (as illustrated), integrated with operating system 108, located remotely in a network accessible location, and so on. In an implementation, reflection module 116 may be representative of one or more application programming interfaces (APIs) of operating system 108 and/or related resources, data, DLLs and the like. In this example, the APIs implementing process reflection techniques may be callable by a variety of applications 110 to create reflected processes 118.

In one example technique to create a reflected process 118, a process 114 may interact directly with reflection module 116 to initiate a process reflection of itself. In another example technique to create a reflected process 118, computing device 102 includes a monitor module 120 that is representative of functionality operable to monitor processes 114 and determine when to reflect a process 114. Monitor module 120 may be further operable to inject code into a process 114 to initiate creation of a reflected process 118. The injected code may interact with refection module 116 and/or interfaces 112 to cause creation of the reflected process 118. Monitor module 120 may be storable in memory 106 and executable via the processor 104. While illustrated separately, monitor module 120 may be implemented as a component of the reflection module 116. Further discussion of techniques to create reflected processes 118 may be found in relation to the following figures.

The computing device 102 is further illustrated as including an analysis tool 122 that may be storable in memory 106 and executable via the processor 104. Analysis tool 122 is representative of a variety of tools operable to analyze processes 114 including reflected processes 118. Such tools may include existing tools applied to reflected process 118, as well as tools designed specifically for process reflection techniques. Because analysis by one or more analysis tools 122 is performed on the reflected process 118 rather than the process 114, a user may experience little or no disruption related to the analysis. A user may not even be aware of process reflection techniques that may occur on a computing device 102 associated with the user.

It is noted that one or more analysis tools 122 may operate on the same computing device 102 as an analyzed process 114 (as depicted). Analysis tools 122 may also operate via a separate computing device 102 to perform analysis in a separate environment (e.g., an analysis/support environment). For instance, a reflected process 118 may be communicated over a network to a support environment where a developer, support technician, or other user may perform analysis. "Online" server/client techniques may be employed by remote support personnel to operate analysis tools 122 over a network to analyze a reflected process 118 of a computing device 102. However, for simplicity sake, the analysis tool 122 is depicted as a component of the illustrated computing device 102 of FIG. 1. Additional discussion of analysis techniques using reflected processes 118 may be found in relation to FIG. 3.

Generally, the functions described herein can be implemented using software, firmware, hardware (e.g., fixed-logic circuitry), manual processing, or a combination of these implementations. The terms "module", "functionality", "engine" and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer-readable memory/media devices. In a software implementation, modules of a computing device 102 are storable in memory 106 and executable via the processor 104. The features of the techniques to provide process reflection techniques are platform independent, meaning that the techniques may be implemented on a variety of commercial computing platforms having a variety of processors.

Example Procedures

The following discussion describes techniques related to process reflection that may be implemented utilizing the previously described environment, systems, and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the example environment 100 of FIG. 1.

Figure 2:
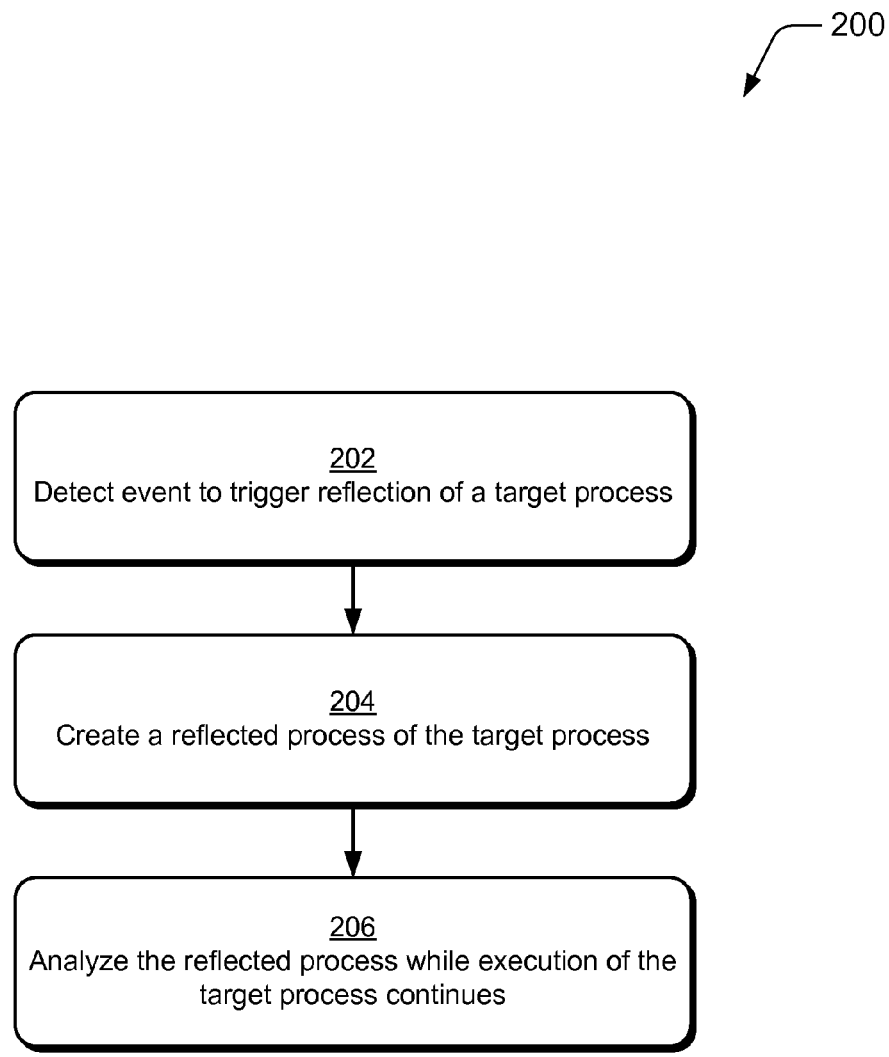
FIG. 2 depicts an example procedure in which process refection is employed to perform analysis of a process.

FIG. 2 depicts an example procedure 200 in which process refection is employed to perform analysis of a process. An event is detected that triggers reflection of a target process (block 202). For example, various events may trigger reflection of a process 114 on a computing device 102. A developer, support technician, or other user may provide input to cause process reflection to be initiated. If a support technician is handling a support call from a consumer, the support technician may discover that an application 110, such as a database program, on the consumer's computing device 102 is causing memory leaks. The support technician may interact with the computing device 102 and provide various input to create a reflected process 118 of the database program in order to troubleshoot the memory leaks. Reflection module 116 and/or monitor module 120 may be configured to detect events and trigger initiation of process reflection based on the input.

In other instances, reflection module 116 and/or monitor module 120 may be configured to initiate process reflection automatically (e.g., without user input) responsive to a variety of events. Examples of events that may automatically trigger reflection of a process 114 include but are not limited to: start-up of the process 114, a time event, non-responsiveness of the process 114, (e.g., a process "hang-up"), an error code, memory leak detection, and/or detection of a state of a process 114.

A reflected process of the target process is created (block 204). For instance, reflection module 116 of computing device 102 may create a reflected process 118 responsive to the various triggers and/or events. Continuing the previous example, input from the support technician may cause reflection module 116 to create a reflected process 118 from a process 114 corresponding to the database program experiencing memory leaks.

In particular, reflection module 116 is operable to obtain relevant portions of data corresponding to the process 114 and to copy the relevant portions to create the reflected process 118. The relevant portions may include a variety of data, parameters, executable code, and the like, that are obtained to create a reflected process 118 that substantially recreates the process 114. In general, reflection module 116 may perform a copy of a memory space and associated parameters that define a process 114. Reflection module 116 may be further operable to communicate the data defining the process 114 (e.g. copied memory and parameters) to the operating system 108 to cause creation of a reflected process 118. In one example, the reflection module 116 may call an application programming interface (API) and communicate the copied memory space and associated parameters as input to create a reflected process 118. A variety of techniques to create a reflected process 118 are contemplated. Example techniques to create a reflected process 118 using a monitor module 120 are discussed with respect to FIG. 3. Example techniques in which a process 114 reflects itself are discussed with respect to FIG. 4.

The reflected process is analyzed while execution of the target process continues (block 206). For instance, an analysis tool 122 of a computing device 102 may perform a variety of analysis, diagnostics, debugging, troubleshooting, and so forth, upon the reflected process 118. As noted, analysis tool 122 may operate via the same computing device 102 as the analyzed process 114 (e.g., locally) or via a separate computing device 102 (e.g., remotely over a network).

Since the reflected process 118 is employed for the analysis rather than the process 114, there may be little or no disruption experienced by a user. Moreover, once created, the reflected process 118 is independent of the process 114. This may be contrasted with traditional techniques to clone or fork a process 114 in which a cloned process has a high degree of dependency on its parent process. This dependency of traditional cloned processes may include sharing of files, handles, code, memory allocation, and other resources.

In contrast, code executed via a reflected process 118 may not affect the process 114, and vice versa. In particular, a reflected process 118 may have its own allocated memory, handles, parameters, and instance of executable code. Further, a process 114 and a reflected process 118 generally do not share resources such as files, parameter, memories, and so forth. While generally handles are different, it is worth noting that optionally some "inheritable handles" may be shared between a process 114 and a reflected process 118. For instance, certain diagnosis may be enhanced through sharing of some handles. Further discussion of "inheritable handles" may be found in relation to FIGS. 3-4. In an implementation, other than some optionally shared handles, a reflected process 118 is substantially independent of the process 114 from which it is derived. Accordingly, execution of a process 114 may continue without significant disruption while analysis is being performed on a reflected process 118.

The reflected process 118 is also "active" in that code implemented by the process reflection module 116, or other code sources, may be run within the reflected process 118. This may be contrasted with a memory dump which is an inactive snapshot of data for a process 114 at a particular time, e.g., a snapshot of the state of the process 114. The reflected process 118 may be analyzed actively in the background so that execution of the originating process 114 may continue. Thus, a user of a process 114 may not be even aware of the analysis being conducted on a reflected process 118. In the above example, once a support technician has created a reflected process 118 of the database program, the control of the database program may be given back to the consumer. Support technician may then use various tools (e.g., analysis tool 122) to troubleshoot the memory leaks in the background, while at the same time the consumer may create, edit, and manipulate records with the database program.

Thus, some characteristics of a reflected process 118 have been described which include being "online" or active, capable of executing code, and independent of a process 114 from which the reflected process 118 is derived. It is contemplated that process reflection techniques and reflected processes 118 may be employed with a wide range of analysis and diagnosis techniques. By way of example and not limitation, the following discussion provides some example scenarios in which a reflected process 118 may be employed for a variety of different types of analysis.

In one example, a reflected process 118 may enable online diagnosis/analysis. In other words, analysis occurs while the process 114 from which the reflected process 118 is derived is "online", e.g., still executing. Traditionally, analysis of a process 114 would involve suspending the process 114 for the duration of the diagnosis. Accordingly, the user may be disrupted and/or some lengthy analysis may be foregone to prevent the associated disruption. Using a reflected process 118, however, a module (e.g., operating system 108, application 110) and/or user may perform online diagnosis (e.g. of memory leaks) on the reflected process 118 using various analysis tools 122. The process 114 does not have to be terminated or suspended so there is virtually no impact to users.

In another example analysis technique, a non-disruptive process dump or memory dump may be created from a reflected process 118 rather than from the process 114. Again, traditionally this involves suspending the process for the duration of the dump collection. In this scenario, a crashed or hung-up application may be restarted more quickly, as compared to traditional techniques, because dump collection and/or checking for solutions occurs using the reflected process 118 instead of the actual process 114. Accordingly, a user may resume work right away instead of waiting for the collection routine to be completed.

In a further example, a reflected process 118 may be employed to perform online debugging. Debugging as used herein refers to finding and correcting errors in code that may be under development. In this scenario, process reflection techniques may be used to reflect a process 114 so a developer may debug the reflected process 118 instead of the actual process 114. A developer may distribute a test version of a program (e.g., beta version) that takes advantage of process reflection techniques. For instance, the test version may incorporate functionality to create a reflected process 118. Various debugging activities, such as data collection, live remote debugging, process analysis, and so forth, may be performed on the reflected process 118 while users continue to use the test version. Accordingly, users (e.g., beta testers) may continue using a computing device 102 and interacting with the test version of the program without being interrupted for debugging. This may allow a developer to obtain more consistent and complete information regarding errors in the code and as a result may o shorten development time.

In yet another example, a reflected process 118 may be employed to perform online process recovery. When an application 110 crashes or hangs-up on a computing device 102, automatic process recovery may attempt to recover data and restart the application 110. Traditionally, this involves saving recovery information from an associated process 114 before the process 114 is closed. In some traditional techniques, an exception handler is employed for the data recovery. Exception handlers may not provide reliable recovery of data. Accordingly, using traditional data recovery techniques may be disruptive and often incomplete.

Using process reflection techniques, a failed process 114 may be reflected to create a reflected process 118. The failed process 114 may then be restarted quickly. The reflected process 118 is used as a source to recover data instead of taking the time to collect data from the failed process 114 before restarting. This data recovery using the reflected process may occur from memory to memory (e.g., from the reflected process 118 to a restarted process 114). Such memory to memory recovery may be faster and more reliable than using an exception handler, which typically operates memory to disk. Thus, using the reflected process 118 to perform online recovery, the time for data recovery may be shortened and data recovery may be more reliable.

In an additional example, a reflected process 118 may be used to enable safe memory scanning. Traditionally, memory scanning (e.g., by anti-virus (AV) or anti-malware (AM) programs) involves a dangerous scan of process memory that may have device memory mapped into it. Reading/scanning device mapped memory may be unsafe and have unforeseen consequences (e.g., data/disk corruption, data loss, hang-ups, and so on). Process reflection techniques enable anti-virus or anti-malware scanning software to reflect a process 114 and scan the reflected process 118. The reflected process 118 may remove device mapped memory and accordingly may be safer to scan.

Another example involves process migration using a reflected process 118. Process migration refers to moving of one or more processes 114 from a first computing device 102 to a second computing device 102. For example, a user running many applications 110 may be asked to reboot the first computing device 102 to install critical security updates. The reboot may be quite disruptive to the user and prevent the user from accomplishing work during the reboot. Process migration is one way in which this disruption may be reduced. In traditional techniques, periodic checkpoints of a process 114 were taken to enable restarting of a process 114 from the latest checkpoint. This periodic creating of checkpoints has associated costs which may include disruption to users to create checkpoints, tie-up of resources (processor 104 and memory 106) that might otherwise be used for other purposes, time to create the checkpoints, memory to store the checkpoints, and so forth.

Process reflection techniques enable a user to reflect each running process 114 on the first computing device 102. Then on the second computing device 102, the user may use the reflected processes 118 to restart the applications 110 and continue working where the user left off. In particular, applications 110 that the user was using may be launched in a process migration state that pulls in the data to recreate the state of the first computing device 102 on the second computing device using the reflected processes 118. Rather than taking periodic checkpoints, a checkpoint may be taken of the reflected processes 118 when the reflected processes 118 are to be migrated. The applications 110 may use the checkpoint of the reflected processes 118 to recreate the state on the second computing device 102. Thus, using process reflection techniques, the costs of taking periodic checkpoints (e.g., time, use of resources, user disruption, and so forth) may be avoided.

Figure 3:
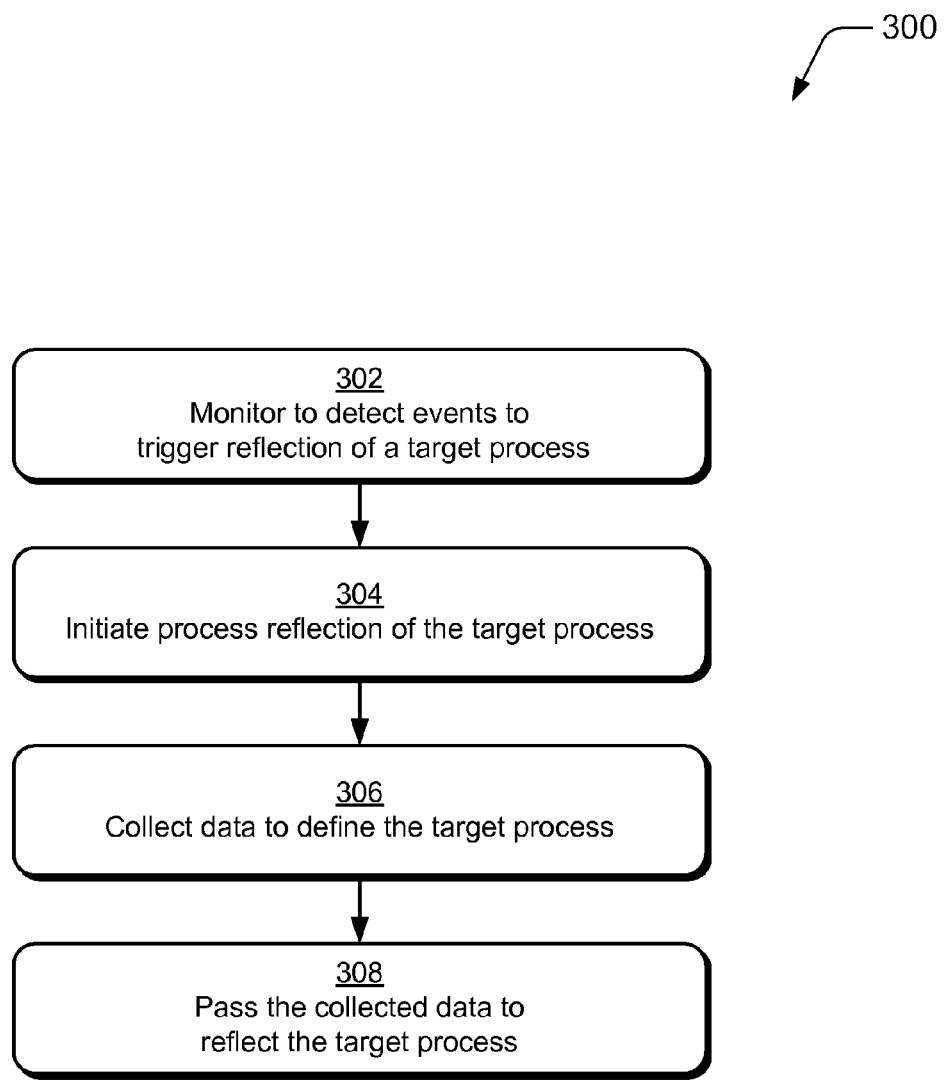
FIG. 3 depicts an example procedure in which a monitor operates to cause reflection of a process.

FIG. 3 depicts an example procedure 300 in which a monitor operates to cause reflection of a process. Monitoring is performed to detect events to trigger reflection of a target process (block 302). For example, a monitor module 120 may operate to monitor one or more running processes 114 of a computing device 102. The monitor module 120 may automatically monitor to detect events, such as hang-ups, crashes, performance metrics, state information, code errors, memory errors, and various other triggering events, that may occur in the one or more processes 118. Monitor module 120 may also be configured to receive input events from users to cause process reflection of a designated process. In an implementation, the monitoring discussed as associated with monitor module 120 may be performed within a process 114 itself, rather than by the monitor module 120.

Process reflection is initiated of a target process (block 304). For example, consider Abby as a consumer user of a computing device 102. Abby may notice that over time her computing device 102 becomes sluggish. This may result from memory leaks caused by an email client used by Abby. In relation to Abby's email client, the monitor module 120 may detect one or more events that signal performance problems. Responsive to detecting these events, the monitor module 120 may pass a process identifier (PID) of the email client to the reflection module 116 to initiate reflection of Abby's email client. Reflection module 116 may then cause a reflected process 118 of Abby's email client to be created. Again, execution of reflection module 116 to cause process reflection may alternatively be initiated by a process 114 itself, without monitor module 120.

Data is collected to define the target process (block 306). For example, to enable creation of a reflected process 118, reflection module 116 may collect data and/or copy a virtual address space of a target process 114 (Abby's email client in the continuing example). Collected data for a target process 114 may includes heaps, threads, copies of code, information on handles, and a variety of other data to define the target process 114. A reflected process 118 that substantially recreates the target process 114 may be created using the collected data that defines the target process 114.

In an example, reflection module 116 may copy information in a virtual address space of a process 114 to collect data that may be used to recreate the process 114 in a reflected process 118. The virtual address space may include a variety of data that defines an associated process 114. Reflection module 116 may copy the virtual address space in whole or in part. In an implementation, the reflection module 116 may be configured to extract relevant portions of the virtual address space that are sufficient to enable recreation of the state the process 114 in a reflected process 116.

In another example, collecting data to define a target process 114 involves providing parameters to collect specified data. For instance, reflection module 116 may allocate memory in the target process 114. The reflection module 116 may provide parameters to collect data sufficient to define the target process 114. These parameters may be loaded to the allocated memory. Then, the reflection module 116 may inject a thread into the target process 114. In the injected thread, the parameters are copied to a call stack to populate the parameters with data defining the target process 114. The allocated memory may then be copied by the reflection module 116 to collect data that is specified by the parameters.

As noted, copying of handles to a reflected process 118 may be optional. For example, to maintain independence between a reflected process 118 and it associated process 114, handles typically may not be copied to the reflected process 118. However, the parameters specified via reflection module 116 may include a configurable inherit handles flag that may be configured to enable one or more inheritable handles to be included in the data that is collected to define a process. Thus, inheritable handles may be optionally selected in some cases. It is noted that some handles related to non-shareable sections of memory 106 may be designated as non-inheritable. The non-inheritable designation may be prevent these handles from being copied, even when the inherit handles flag is set to permit copying of inheritable handles.

The collected data is passed to reflect the target process (block 308). For example, date that is collected from a process 114 associated with Abby's email client may be passed to an operating system 108 of a computing device 102. Operating system 108 may implement functionality to create a reflected process 118 from the collected data. In particular, the reflection module 116 may interact with one or more interfaces 112 (e.g., application programming interfaces (APIs)) through which functionality to reflect a process 114 may be made available. Once a reflected process 118 is created, various analysis may be performed using the reflected process 118 as discussed with respect to FIG. 2.

In the preceding example, various analysis of the reflected process 118 may identify the memory leaks associated with Abby's email client. An automatic fix could then be communicated to Abby's computing device 102 to correct the memory leaks. The fix may be installed automatically and Abby may notice the sluggishness disappear. During the analysis, Abby may be able to continue use of the email client (and an associated process 114) with little or no disruption. Abby may not even be aware of the process reflection techniques which may occur behind the scenes to fix her email client.

Figure 4:
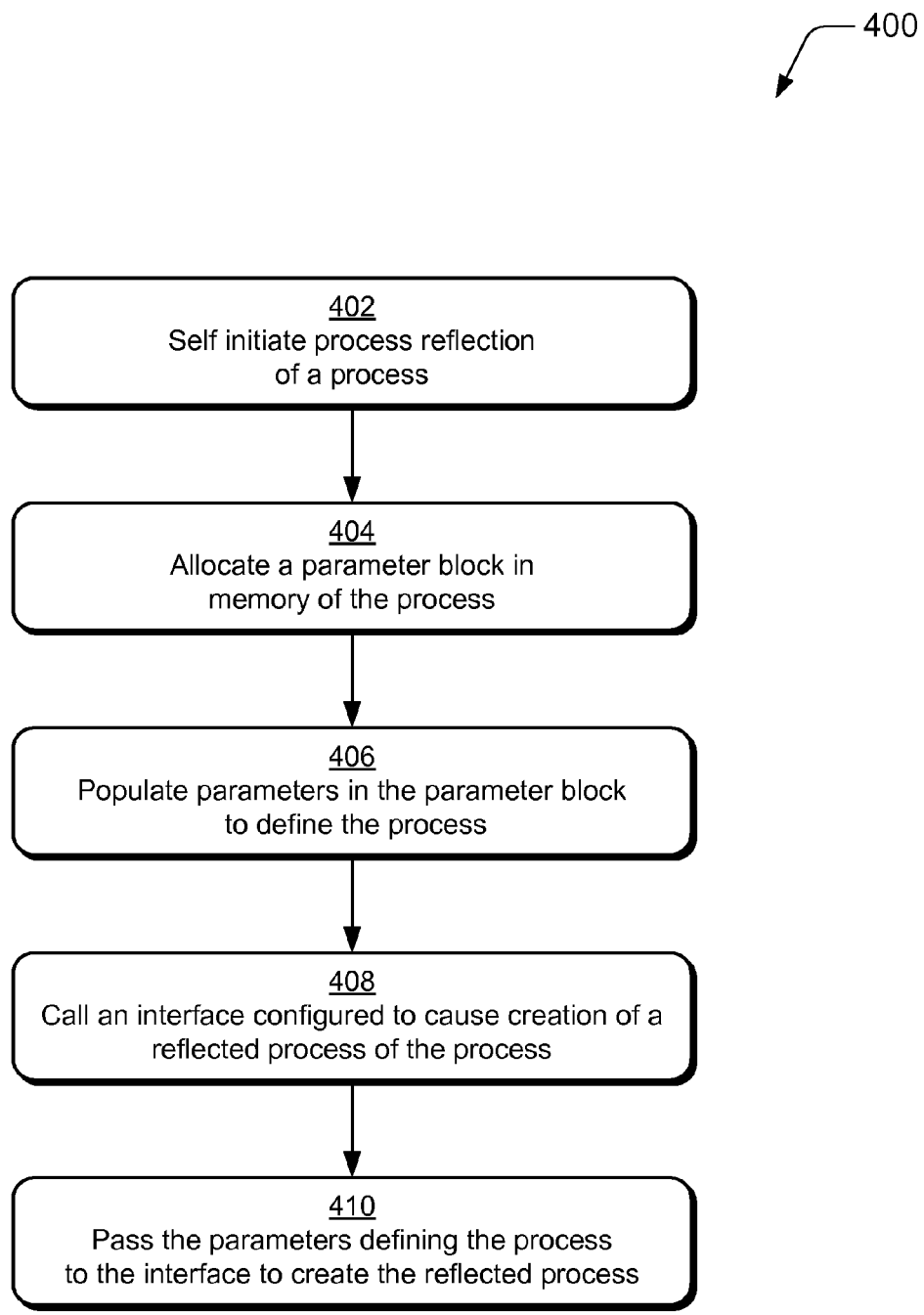
FIG. 4 depicts an example procedure in which a process initiates a reflection of itself.

FIG. 4 depicts an example procedure 400 in which a process initiates a reflection of itself. A process initiates process reflection of itself (block 402). For example, a process 114 associated with a business application used by Patrick at work may be configured to initiate process reflection of itself. In particular, the business application may be configured with code to take advantage of process reflection techniques. In an implementation, business application does not rely upon a separate monitor module 120 to initiate process reflection. However, an application 110, such as Patrick's business application, may be configured to initiate process reflection techniques through either or both of a monitor module 120 as in example procedure 300 of FIG. 3 or through self initiation as in example procedure 400 of FIG. 4. Patrick may experience sporadic crashes or hang-ups that may potentially cause Patrick to lose unsaved work. Process reflection techniques described herein may be used to quickly restart a process 114 and recover Patrick's important data. For example, when a crash of the business application occurs, code within associated process 114 may initiate execution of the reflection module 116 to create a reflected process 118. As noted a monitor module 120 could also be employed to initiate process reflection.

To enable creation of a reflected process 118, reflection module 116 may collect data and/or copy a virtual address space of a process 114 (Patrick's business application in this example). More particularly, a parameter block is allocated in memory of the process (block 404). Parameters in the parameter block are populated to define the process (block 406).

In this example, reflection module 116 may allocate memory of the process 114 that is associated with the business application to store various parameters. Reflection module 116 may populate the parameter block with parameters sufficient to recreate a process 114 in a reflected process 118. Data defining a process may then be collected via the parameters. When data defining the process 114 has been collected, the allocated memory including the parameters may be copied to enable creation of the reflected process 118. While aspects of procedure 400 are described as using parameters, a variety of other techniques to collect data defining a process 114 are contemplated that may be employed with process reflection techniques without departing from the sprit and scope thereof.

An interface is called that is configured to cause creation of a reflected process of the process (block 408). The parameters defining the process are passed to the interface to create the reflected process (block 410). For example, reflection module 116 may call an application programming interface (API) or equivalent functionality that is operable to cause creation of a reflected process 118. Data that is collected to define the process 114 related to Patrick's business application, including the parameters, may be passed to the API by the reflection module 116. The API may be configured to enable interaction with functionality of the operating system 108 to reflect the process 114 based upon the collected and passed data. The operating system 108 may accordingly create a reflected process 118 that substantially recreates process 114 associated with Patrick's business application.

Once a reflected process 118 corresponding to Patrick's business application is created, the business application may be quickly restarted so that Patrick does not lose time. Further, process recovery operations may be performed on the reflected process 118 so that Patrick experiences little or no disruption. Patrick's data may be recovered through the reflected process 118. A variety of other types of analysis may be performed using the reflected process 118 of Patrick's business application, examples of which include the various analysis discussed with respect to FIG. 2.

CONCLUSION

Although the process reflection techniques have been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. One or more computer-readable storage devices storing instructions which, when executed, cause a computing device to:
   detect an event to trigger reflection of a target process;
   create a reflected process of the target process by at least copying a virtual address space associated with the target process to collect data defining the target process and transfer the data to the reflected process; and
   analyze the reflected process while execution of the target process continues.

2. One or more computer-readable storage devices as recited in claim 1, wherein the reflected process is initiated through injection of a thread into the target process by a monitor process that is separate from the target process.

3. One or more computer-readable storage devices as recited in claim 1, wherein the reflected process is initiated by the target process.

4. One or more computer-readable storage devices as recited in claim 1, wherein creating the reflected process further comprises including an executable thread in the reflected process configured to execute code within the reflected process.

5. One or more computer-readable storage devices as recited in claim 1, wherein the reflected process is independent of the target process from which the reflected process is derived.

6. One or more computer-readable storage devices as recited in claim 1, wherein creating the reflected process further comprises:
   collecting data to define the target process; and
   calling an application programming interface (API) with the collected data to cause creation of the reflected process through functionality integrated with an operating system.

7. One or more computer-readable storage devices as recited in claim 1, wherein to analyze includes online diagnosis of the reflected process.

8. One or more computer-readable storage devices as recited in claim 1, wherein to analyze includes debugging of test code using the reflected process to collect data regarding code errors.

9. One or more computer-readable storage devices media as recited in claim 1, wherein to analyze includes creating a process dump from the reflected process.

10. One or more computer-readable storage devices as recited in claim 1, wherein to analyze includes online process recovery using the reflected process to obtain recovered data.

11. One or more computer-readable storage devices as recited in claim 1, wherein to analyze include scanning of the reflected process to detect memory leaks caused by the target process.

12. One or more computer-readable storage devices as recited in claim 1, wherein to analyze includes process migration of the target process through the reflected process from one computing device to another computing device.

13. A method comprising:
   detecting an event to initiate process reflection of a target process;
   collecting data to define the target process by at least copying a virtual address space associated with the target process; and
   communicating the collected data to an application programming interface to create a reflected process according to the collected data.

14. A method as recited in claim 13, wherein collecting data to define the target process includes:
   allocating memory in the target process;
   loading parameters to enable the process reflection to the allocated memory;
   injecting a thread into the target process;
   in the injected thread, populating the parameters with data that defines the target process; and
   copying the allocated memory including the populated parameters.

15. A method as recited in claim 13, wherein the detecting is performed by a monitor process separate from the target process.

16. A method comprising:
   initiating by a target process a reflection of the target process;
   allocating a parameter block in memory of the target process;
   populating parameters in the parameter block with data describing the target process wherein populating the parameters includes designating one or more handles as inheritable and copying the one or more handles to the parameters to share with the reflected process; and
   calling an application programming interface with the parameters to cause an operating system to create a reflected process according to the parameters.

17. A method as recited in claim 16, further comprising performing analysis on the reflected process to troubleshoot the target process while execution of the target process continues.

18. A method as recited in claim 17, further comprising copying a virtual address space associated with the target process to collect the data defining the target process.

* * * * *